(12) United States Patent
Prasad et al.

(10) Patent No.: US 8,432,989 B2
(45) Date of Patent: Apr. 30, 2013

(54) MAX-LOG STACK DECODER

(75) Inventors: Narayan Prasad, Sugar Maple, NJ (US); Xiaodong Wang, New York, NY (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 915 days.

(21) Appl. No.: 12/549,574

(22) Filed: Aug. 28, 2009

(65) Prior Publication Data

US 2010/0158150 A1 Jun. 24, 2010

Related U.S. Application Data

(60) Provisional application No. 61/138,617, filed on Dec. 18, 2008.

(51) Int. Cl.
*H04B 7/02* (2006.01)
*H04L 1/02* (2006.01)

(52) U.S. Cl.
USPC ............................ 375/267; 375/259; 375/260

(58) Field of Classification Search ................... 375/267
See application file for complete search history.

(56) References Cited

U.S. PATENT DOCUMENTS

| 8,000,416 B2 * | 8/2011 | Teo et al. ........................ 375/341 |
| 2007/0286313 A1 * | 12/2007 | Nikopour-Deilami et al. ............................ 375/341 |
| 2009/0213966 A1 * | 8/2009 | Teo et al. ........................ 375/341 |

OTHER PUBLICATIONS

D. Murugan, H. El Gamal, M. O. Damen, and G. Caire, A Unified Framework for Tree Search Decoding: Rediscovering the Sequential Decoder, *IEEE Transactions on Information Theory*, Mar. 2006.
B. Hassibi and H. Vikalo, On the sphere decoding algorithm: Part I, the expected complexity *IEEE Transactions on Signal Processing*, vol. 53, No. 8, pp. 2806-2818, Aug. 2005.
B. Hassibi and H. Vikalo, On the sphere decoding algorithm: Part II, generalizations, second-order statistics and applications to communications *IEEE Transactions on Signal Processing*, vol. 53, No. 8, pp. 2819-2834, Aug 2005.
H. Vikalo, B. Hassibi and T. Kailath, Iterative decoding for MIMO channels via modified sphere decoder, *IEEE Transactions on Wireless Communications*, vol. 3 No. 6, pp. 2299-2311, Nov. 2004.
Viterbo and J. Boutros, "A universal lattice code decoder for fading channels," *IEEE Trans. on Inf. Th.*, vol. 45, No. 5, pp. 1639-1642, Jul. 1999.

* cited by examiner

*Primary Examiner* — Erin File
(74) *Attorney, Agent, or Firm* — Joseph Kolodka; Bao Tran (57) ABSTRACT

A method for demodulating signals in a multi-input multi-output (MIMO) receiver includes obtaining a transformed vector by a coordinate transformation of a received observation vector using a unitary matrix determined through QR decomposition of an estimated channel matrix; maintaining a list containing nodes along with a cost metric for each node; using the list to generate soft-outputs in the form of log-likelihood ratios (LLRs) for selected symbols of interest, based on the transformed vector and a lower triangular matrix determined through QR decomposition of the estimated channel matrix and the constellations to which the input symbols belong.

25 Claims, 4 Drawing Sheets

MAX-LOG STACK DECODER

The present application claims priority to U.S. Provisional Application Ser. No. 61/138,617, filed Dec. 18, 2008, the content of which is incorporated by reference.

BACKGROUND

The present invention relates generally to mobile communications, and, more particularly, to multi-stream receivers for multiple-input multiple-output MIMO systems and their extensions.

As discussed in co-pending, commonly owned Published Applications Serial No. 20080225976, the content of which is incorporated by reference, mobile wireless communications systems employing multiple transmit and receive antennas have received much attention lately. This is due—in part—to the fact that the capacity of such systems increases linearly with the minimum of the number of transmit and receive antennas without requiring any additional power or bandwidth. Of the known signal detection schemes employed in contemporary MIMO systems, a maximum-likelihood (ML) scheme is one of the most attractive. Unfortunately however, ML schemes exhibit a computational complexity that makes its implementation infeasible or impractical for large systems.

As further discussed in co-pending, commonly owned Published Application No. 20080069262, the content of which is incorporated by reference, a known brute force maximum likelihood ML reception method for two streams involves listing all possible pairs for symbols, evaluating the metric for each pair, using the metrics to determine the exact max-log LLRs (maximum log likelihood ratios) for all the bits and decoding the codeword(s) using the computed LLRs. Although the brute force ML method provides optimal demodulation it is highly complex.

State of the art demodulators have used the Deterministic Sequential Monte-Carlo (D-SMC) multi stream receiver or the successive interference cancellation (SIC) receiver. Complexity reduction is achieved with the D-SMC method by computing the soft output for each coded bit over only a reduced set of hypotheses. The price paid for this complexity reduction is that the D-SMC suffers from the "missing candidate problem", in that the hypotheses (or candidates) necessary for computing the soft outputs for some of the bits may not be present in the reduced set. This missing candidate problem can cause significant degradation in the performance particularly if the reduced set is relatively small compared to the set of all hypotheses. Heuristic techniques to alleviate this problem in the D-SMC have also been proposed but such techniques require a lot of system or scenario specific fine tuning and may not work well under across all conditions.

The SIC receiver is a sequential receiver where one stream is first decoded, re-constructed and then subtracted from the received signal before decoding the remaining streams. The soft output for each stream is obtained after assuming the un-decoded streams to be Gaussian interferers, which can lead to performance degradation and the sequential process results in increased latency.

SUMMARY

A method for demodulating signals in a multi-input multi-output (MIMO) receiver includes obtaining a transformed vector by a coordinate transformation of a received observation vector using a unitary matrix determined through QR decomposition of an estimated channel matrix; maintaining a list containing nodes along with a cost metric for each node; using the list to generate soft-outputs in the form of log-likelihood ratios (LLRs) for selected symbols of interest, based on the transformed vector and a lower triangular matrix determined through QR decomposition of the estimated channel matrix and the constellations to which the input symbols belong.

Implementations of the above method may include one or more of the following. The QR decomposition of the estimated channel matrix can be H=QL where Q is semi unitary (Q*Q=I); and $$L = \begin{bmatrix} L_{1,1} & 0 & \cdots & 0 \\ L_{2,1} & L_{2,2} & \ddots & 0 \\ \vdots & \vdots & \ddots & 0 \\ L_{K,1} & L_{K,2} & \cdots & L_{K,K} \end{bmatrix}$$

is the lower triangular matrix with positive diagonal elements. The method can determine the transformed vector z as: z=Q*y, where y is the vector of received observations. The method includes selecting a node with a minimum metric among all nodes in the list and removing the selected node from the list. The method can determine whether the selected node is a leaf node and process the selected node using an LLR module, if the selected node is a leaf node. The method includes determining whether the selected node is the first leaf node to be examined by the LLR module and if so, determining the bits corresponding to the selected node and otherwise determining first the bits corresponding to the selected node and then determining an LLR for each index for which the bit of the selected node is different from the bit of the first examined leaf node. The system can expand the descendents of a selected partial or non-leaf node and adding the descendents and their metrics to the list. Nodes and their metrics which have the same values for symbols of interest as those in a selected leaf node can be removed to speed up processing. The method includes analyzing at-most a predetermined number of leaf nodes using an LLR module. Non-leaf nodes can be removed from the list to leave only leaf-nodes and their metrics in a pruned list. The pruned list can be generated if more than a predetermined number of LLRs have been generated or if more than a predetermined number of leaf nodes have been analyzed. The system can force the list to only contain nodes whose associated metrics are less than a specified input parameter C. Only children to the list whose associated metrics are no greater than C are added. The input parameter C can be incremented if the list becomes empty before an LLR analysis of D leaf nodes, where D is also a predetermined selection. The method includes determining whether all required LLRs have been generated by checking if a set Ω is empty. If the set Ω is not empty, the system determines the magnitude of the remaining LLRs as a large positive number such as the magnitude of the largest generated LLR. The system can generate soft-outputs in the form of LLRs for a specified subset of the input quadrature amplitude modulation (QAM) symbols. The method includes identifying a root node and the child of the root node having the smallest metric; and selecting from the children of all nodes in a list, a best child having the smallest metric. A best valid node among all nodes in a list can be identified and removed from that list. The method includes determining for each selected leaf node a valid sibling with the smallest metric and adding the sibling to a list. Additionally, the system determines for each selected non-leaf node a valid sibling with the smallest metric and a valid child with the smallest metric and adding them to a list while adding the selected node to another list.

Advantages of the preferred embodiment may include one or more of the following. The system provides improved receiver design for multi-input multi-output (MIMO) systems. The receiver has to generate soft-outputs in the form of log-likelihood ratios (LLRs) for symbols of interest, based on a received observation vector and an estimated channel matrix. The received observation vector is the output of the MIMO channel in response to multiple input symbols. The receiver knows the constellation to which each input symbol belongs but does not have to generate LLRs for some of the input symbols (which are not of interest). Additionally, the system provides multi-stream receivers that are eminently suitable for practical use since they entail low-latency and low complexity which are necessary to meet the spectral efficiency targets set for advanced systems such as the Evolved-UMTS Terrestrial Radio Access (EUTRA).

BRIEF DESCRIPTION OF THE DRAWINGS

Further features and aspects of the present invention may be understood with reference to the accompanying drawing in which.

DESCRIPTION

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

The system provides a receiver design for multi-input multi-output (MIMO) systems. The receiver generates soft-outputs in the form of log-likelihood ratios (LLRs) for symbols of interest, based on a received observation vector and an estimated channel matrix. The received observation vector is the output of the MIMO channel in response to multiple input symbols. The receiver knows the constellation to which each input symbol belongs but does not have to generate LLRs for some of the input symbols (which are not of interest).

In embodiment, a MIMO system can include several components at a transmitter side including a QAM Modulator, a Demultiplexer, an input bit sequence, and a number of output substreams. Operationally—at the transmitter—a binary bit sequence $\{b_i\}$ is mapped to complex data symbols that take values from an QAM alphabet set $A=\{a1, a2, \ldots, aS\}$ (of size S) through the effect of the modulator. An output symbol stream is subsequently demultiplexed through the effect of the demultiplexer into M parallel substreams, $\{x_k\}$, $k=1, 2, \ldots, M$, where substream $\{x_k\}$ is associated with the k-th transmit antenna. During each symbol interval, M symbols are transmitted simultaneously, one from each of the transmit antennas.

Figure 1:
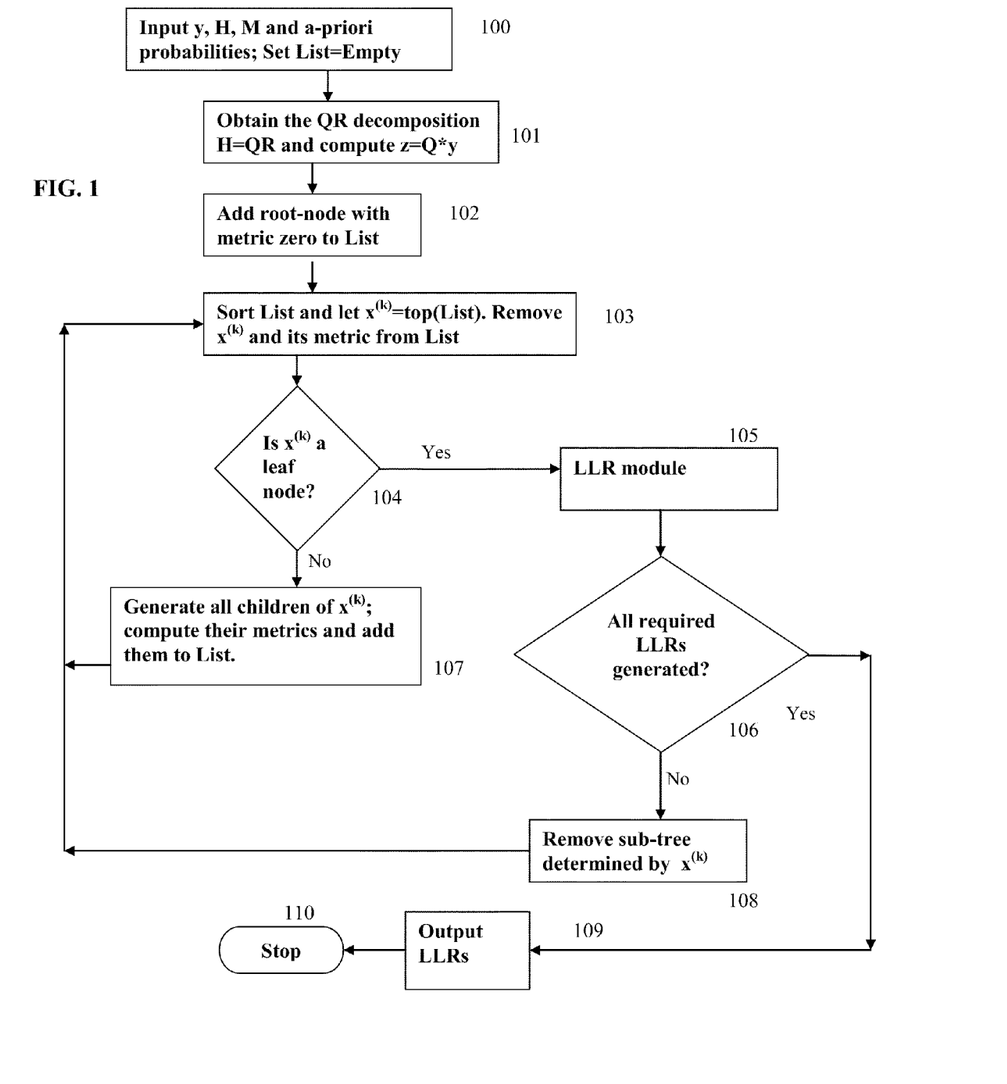
FIG. 1 shows an efficient decoder referred to as the Max-log Stack Decoder.

FIG. 1 shows an efficient decoder referred to as the Max-log Stack Decoder. In this embodiment, the received signal model can be represented as $$y=Hx+v;$$

where H is a full rank N×K matrix (with N≥K) and v is the additive noise vector with $E[vv^*]=I$ and where x is a vector of QAM symbols, i.e., each element of x belongs to a QAM constellation.

Expanding x as $x=[x_1, \ldots, x_K]$, the process of FIG. 1 generates soft-outputs in the form of log-likelihood ratios (LLRs) for any specified subset of the K QAM symbols. In the following discussion of FIG. 1, without loss of generality, the first M symbols, where $1<=M<=K$, are of interest. In one embodiment, the symbols $\{x_k\}$, $k=M+1, M+2, \ldots, K$ are not of interest and could be transmitted by other users.

In the Max-log Stack Decoder, block 100 performs an initialization of the observation vector y; the channel matrix H and the integer M such that the LLRs of the bits corresponding to the symbols $x_1, \ldots, x_M$ are generated. The operation also receives as input the a-priori probabilities $p_i(x_i)$ for $1<=i<=K$. If for some or all of the symbols no a-priori probabilities are available, those symbols are assumed to be equiprobably distributed over their respective constellations. Equivalently, those a-priori probabilities can be dropped from the metric computations specified in block 107. An empty list is also initialized.

Next, in block 101, the QR decomposition of the channel matrix is computed:

$$H=QL,$$

where Q is semi unitary, i.e., $Q^*Q=I$;

$$L = \begin{bmatrix} L_{1,1} & 0 & \cdots & 0 \\ L_{2,1} & L_{2,2} & \ddots & 0 \\ \vdots & \vdots & \ddots & 0 \\ L_{K,1} & L_{K,2} & \cdots & L_{K,K} \end{bmatrix}$$

is lower triangular with positive diagonal elements

In linear algebra, a QR decomposition (also called a QR factorization) of a matrix is a decomposition of the matrix into a semi-unitary matrix and a triangular matrix. Next using Q, the process determines $$z=Q^*y$$

z can be expanded as
$z=[z_1, \ldots, z_K]^T=Lx+\tilde{v}$
and where $E[\tilde{v}\tilde{v}^*]=I$ In block 102, a pair (Root, 0) is added to the List. The descendents (or children) of the Root-node are all the possibilities of the first symbol $x_1$ and the metric associated with the root node is 0.

In block 103, all the nodes in the List are sorted in the ascending order of their associated metrics. $x^{(k)}$ is used to denote the node at the top of the sorted List, i.e., the node in the List whose associated metric is the smallest. $x^{(k)}$ and its associated metric are then removed from the list.

In block 104, a check is made to determine whether $x^{(k)}$ is a leaf node, i.e., if $x^{(k)}$ has no descendents. In block 105, a log likelihood ratio (LLR) module analyzes the leaf node. First, the process checks if the leaf node $x^{(k)}$ is the first leaf node examined by the LLR module, i.e., if it is the first leaf node which has risen to the top of the sorted list. If yes the process sets $\hat{\lambda} = f(x^{(k)})$, where $f(x^{(k)})$ denotes the metric associated with $x^{(k)}$ $\hat{b} = \text{demap}(x^{(k)})$; where $\text{demap}(x^{(k)})$ yields the bits corresponding to the first M symbols in $x^{(k)}$ Let $\hat{b} = [\hat{b}_1, \ldots, \hat{b}_Q]$; Set $\Omega = \{1, \ldots, Q\}$;

Alternatively, if the node is not the first leaf node to be examined by the LLR module, the process performs the following operations:

```
b = demap(x^(k))
Let b = [b_1, ..., b_Q]
For all i ∈ Ω
    If b_i ≠ b̂_i then
        λ_i = (-1)^(b_i) (f(x^(k)) - λ̂);
        Ω ← Ω \ i
    End If
End For
```

In block 106, a decision is made to determine whether all required LLRs have been generated by checking if the set $\Omega$ is empty. All required LLRs are deemed to be generated only if $\Omega$ is empty. Next, in block 107, the process expands the partial-node (i.e., a non leaf-node) $x^{(k)}$ as $x^{(k)} = [u_1, \ldots, u_k]$; where $u_j, 1 \leq j \leq k$, denotes a particular QAM symbol Suppose the symbol $x_{k+1}$ belongs to a QAM constellation $S$ of size $|S|$.

For each $u \in S$, generate a node $[u_1, \ldots, u_k, u]$ having the associated metric $$f([u_1, \ldots, u_k, u]) = f(x^{(k)}) + \left| z_{k+1} - L_{k+1,k+1} u - \sum_{j=1}^{k} L_{k+1,j} u_j \right|^2 - \log(p_{k+1}(u))$$

Add the pairs $([u_1, \ldots, u_k, u], f[u_1, \ldots, u_k, u])$ for all $u \in S$ into the List;

In block 108, the process uses the leaf-node $x^{(k)}$ with the following pseudo-code:

Let $x^{(k)} = [u_1^{(k)}, \ldots, u_k^{(k)}]$; where $u_m^{(k)}, 1 \leq m \leq k$, denotes a particular QAM symbol Consider each pair $(x^{(j)}, f(x^{(j)}))$ from the List and let $x^{(j)} = [u_1^{(j)}, \ldots, u_j^{(j)}]$ If $u_m^{(k)} = u_m^{(j)}$ for all $1 \leq m \leq M$ then remove the pair $(x^{(j)}, f(x^{(j)}))$ from the List;

Else retain the pair $(x^{(j)}, f(x^{(j)}))$ in the List

In block 109, the generated LLRs are provided as outputs and the process terminates in block 110.

In one variation, to limit complexity, the system can force the demodulator to stop once the number of leaf nodes examined by the LLR module is equal to an input parameter J. In this variation, the decoder works as shown in FIG. 1 but with the following changes: a counter is maintained which counts the number of leaf nodes examined by the LLR module and if the counter value is equal to J and not all the required LLRs have been generated, then the following procedure can be adopted. Alternatively, the system can force the demodulator to stop once the LLRs have been generated for more than or equal to a pre-determined number of bits and the procedure described below can be adopted to obtain LLRs for the remaining bits.

The procedure first performs step 1 followed by step 2. Alternatively, the procedure can directly jump to step 2.

Step-1: The system removes all non-leaf nodes from the sorted List. Then, only the leaf-nodes along with their associated metrics are left in the pruned List. The following pseudo-code is then performed:

```
Repeat
    Let x^(k) be the leaf node on top of the pruned list
    b = demap(x^(k))
    Let b = [b_1, ..., b_Q]
    For all i ∈ Ω
        If b_i ≠ b̂_i then
            λ_i = (-1)^(b_i) (f(x^(k)) - λ̂);
            Ω ← Ω \ i
        End If
    End For
    Remove the pair (x^(k), f(x^(k))) from the pruned List;
Until Ω is empty or the pruned list is empty
```

Step 2: In the following, $\Omega$ denotes the set of bit indices for which the LLRs have not yet been found. If $\Omega$ is empty step-2 is skipped else the following procedure is performed: The process sets Max to a large positive number. For example Max can be chosen as the magnitude of the largest LLR determined (either before or after step-1) and the following can be done:

```
For all i ∈ Ω
    If b̂_i = 1 then
        λ_i = Max
    Else λ_i = -Max
    End If
End For
```

In one variation, to limit the complexity, the system can force the list to only contain nodes whose associated metrics are all less than a specified input parameter C. This is achieved by adding only those children to the list in block 107, whose associated metrics are no greater than C. The parameter C can be incremented (using any rule, for instance C→2C) if the List becomes empty before the LLR module has examined D leaf nodes, where D is also a specified input. If the list becomes empty after the LLR module has examined D leaf nodes but $\Omega$ is not empty, the system can compute the remaining LLRs as follows, where again Max is a large positive number which for example can be chosen as the magnitude of the largest LLR determined so far:

```
For all i ∈ Ω
    If b̂_i = 1 then
        λ_i = Max
    Else λ_i = -Max
```

-continued

```
    End If
End For
```

Figure 2:
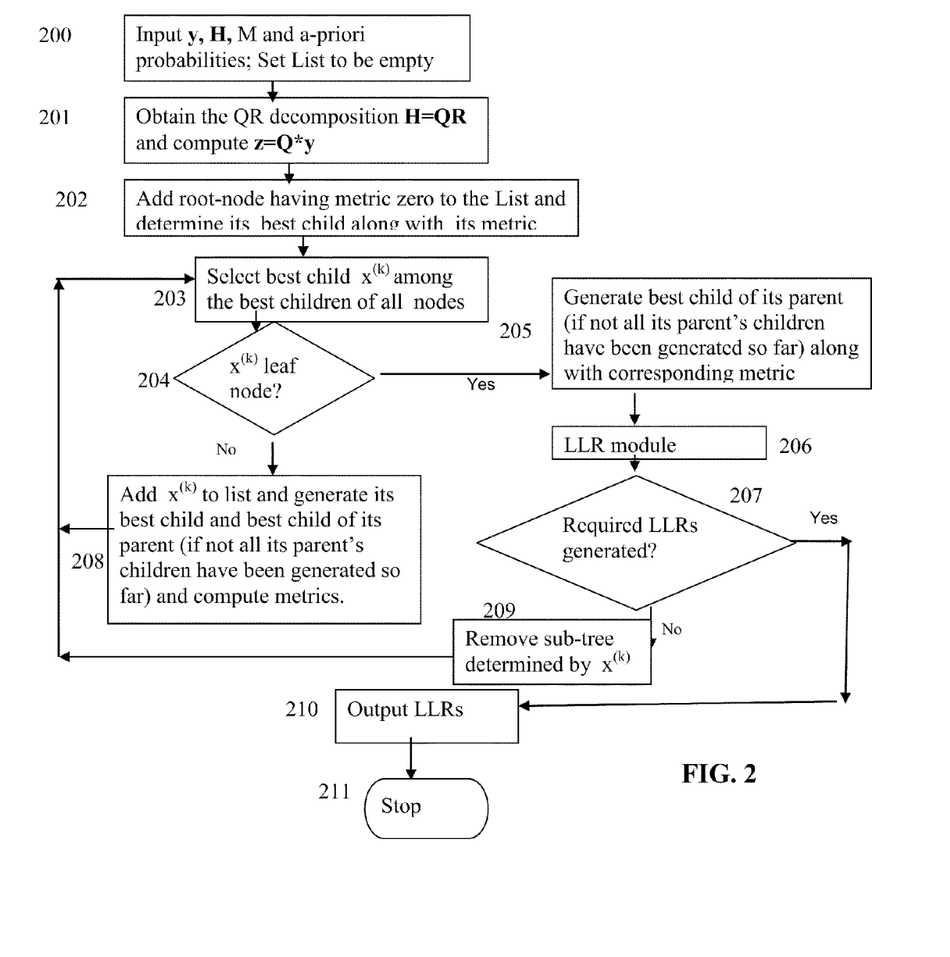
FIG. 2 shows another version of the Max-log Stack Decoder

The process of FIG. 2 describes another embodiment of the Max-log stack decoder which also generates soft-outputs in the form of log-likelihood ratios (LLRs) for any specified subset of the K quadrature amplitude modulation (QAM) symbols. In the following discussion of FIG. 2, without loss of generality, the first M symbols, where 1<=M<=K, are of interest. In FIG. 2, operations in blocks 200 and 201 are identical to their counterparts 100 and 101 in FIG. 1, respectively.

In block 202, a pair (Root, 0) is added to the List and the metric associated with the root node is 0. The descendents (or children) of the Root-node are all the possibilities of the first symbol $x_1$ and among these children the best child (i.e., the one having the smallest metric) is determined along with its corresponding metric.

In block 203, among the best children of all nodes in the list, the child with the smallest metric is selected and denoted by $x^{(k)}$. In block 204, a check is made to determine whether $x^{(k)}$ is a leaf node, i.e., if $x^{(k)}$ has no descendents. If $x^{(k)}$ is a leaf node, in block 205, the best (minimum metric) child of its parent that is distinct from $x^{(k)}$ and is not present in the list is determined along with the corresponding metric. The best child is set to be null if all other children of $x^{(k)}$'s parent (i.e., $x^{(k)}$'s siblings) are present in the list.

In block 206 a log likelihood ratio (LLR) module analyzes the leaf node. The LLR module is identical to the one described in block 105 of FIG. 1. In block 207, a decision is made to determine whether all required LLRs have been generated by checking if the set $\Omega$ is empty. All required LLRs are deemed to be generated only if $\Omega$ is empty.

If in the check in block 204, $x^{(k)}$ is found not to be leaf node, the process proceeds to block 208. In block 208, the process adds $x^{(k)}$ to the list and determines the best (minimum metric) child of $x^{(k)}$ along with the corresponding metric. It also determines the best child of $x^{(k)}$'s parent (among all its parent's children that have not been added to the list so far) along with its corresponding metric. Next, the block 209 is identical to the one described in block 108. In block 210, the generated LLRs are provided as outputs and the process terminates in block 211.

Figure 3:
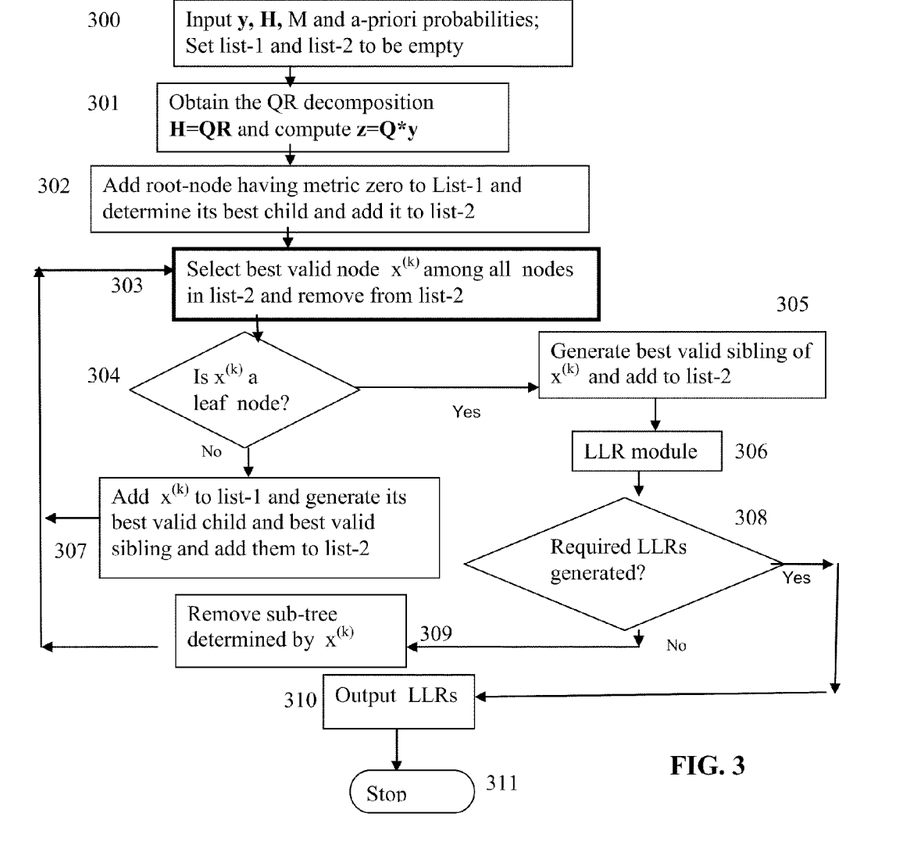
FIG. 3 shows another version of the Max-log Stack Decoder

The process of FIG. 3 describes another embodiment of the Max-log stack decoder which also generates soft-outputs in the form of log-likelihood ratios (LLRs) for any specified subset of the K QAM symbols. In the following discussion of FIG. 3, without loss of generality, the first M symbols, where 1<=M<=K, are of interest.

The operation in blocks 300 and 301 are identical to their counterparts in 100 and 101, respectively, except that in block 300, two empty lists, list-1 and list-2, are initialized.

In block 302, a pair (Root, 0) is added to the list (referred to as list-1) and the metric associated with the root node is 0. The descendents (or children) of the Root-node are all the possibilities of the first symbol $x_1$ and among these children the best child (i.e., the one having the smallest metric) is determined along with its corresponding metric and added to another list, referred to as list-2.

In block 303, the best valid node is selected from list-2 and is denoted by $x^{(k)}$. The procedure to determine whether a node is valid is as follows. If the LLR module in step 306 has not yet examined a leaf node, then all nodes are valid. Otherwise, let $\Omega$ denote the set of bit indices for which the LLRs have not yet been found. Let $\hat{b}$ denote the vector containing the bits corresponding to the first M symbols of the leaf node first examined by the LLR module. Let b denote the vector containing the bits corresponding to the first M or fewer symbols of the node whose validity is to be determined. The node is valid if and only if there exists an index i in $\Omega$ such that $\hat{b}(i) \neq b(i)$. Any index i in $\Omega$ for which the bit b(i) is not available is also assumed to satisfy the condition for validity.

The process of selecting the best valid node from list-2 is described as a pseudo-code next.

```
Initialize done=0;
Repeat
1. Select and remove the best node from list-2
2. Check the validity of the best node
3. If the best node is valid then set done=1; Else among all its valid
  siblings that have never been added to list-2, pick the one that has the
  smallest metric. If such a sibling is found, then insert it to list-2.
Until done is equal to 1
```

In block 304, a check is made to determine whether $x^{(k)}$ is a leaf node, i.e., if $x^{(k)}$ has no descendents. If $x^{(k)}$ is a leaf node, in block 305, among all its valid siblings that have never been added to list-2, the one with the smallest metric is chosen and if such a sibling is found, it is inserted to list-2.

In block 306 a log likelihood ratio (LLR) module analyzes the leaf node. The LLR module is identical to the one described in step 105.

In block 307, a decision is made to determine whether all required LLRs have been generated by checking if the set $\Omega$ is empty. All required LLRs are deemed to be generated only if $\Omega$ is empty.

If in the check in step 304, $x^{(k)}$ is found not to be leaf node, the process proceeds to step 308. In block 308, the process adds $x^{(k)}$ to list-1. Moreover, among all its valid siblings that have never been added to list-2, the one with the smallest metric is chosen and if such a sibling is found, it is inserted to list-2. Similarly, among all its valid children that have never been added to list-2, the one with the smallest metric is chosen and if such a child is found, it is inserted to list-2.

Next, the block 309 is identical to the one described in step 108. In block 310, the generated LLRs are provided as outputs and the process terminates in block 311.

The processes of FIGS. 1-3 enable the receivers to meet the spectral efficiency targets set for advanced wireless communication systems by ensuring low-latency and low complexity. Such receivers are particularly needed at the user equipment (UE) where the complexity constraints are much more stringent. The most important scenario in the multiple antenna downlink system involves UEs with multiple antennas, where the base-station transmits encoded streams to a scheduled UE.

Figure 4:
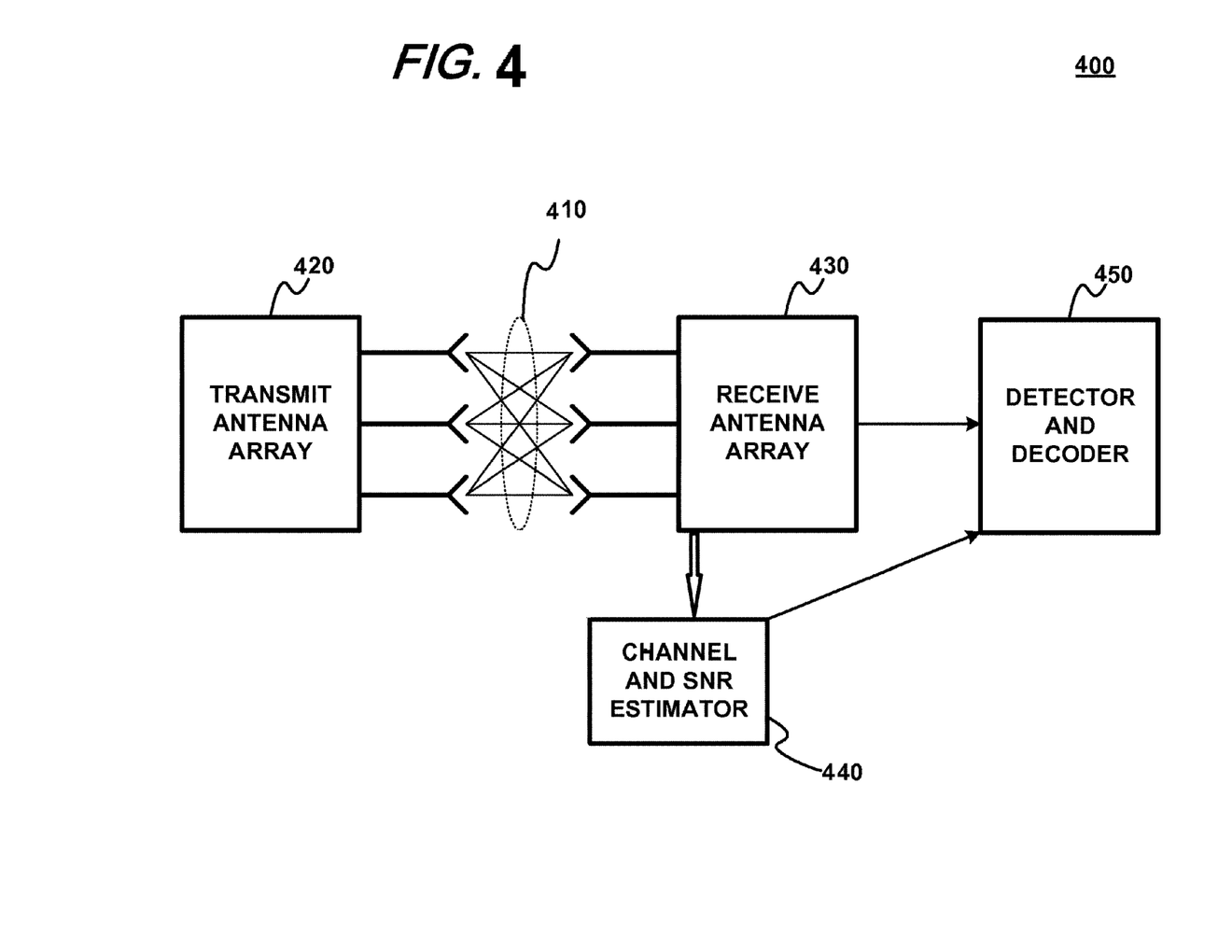
FIG. 4 is an exemplary schematic block diagram of a MIMO system.

FIG. 4 is an exemplary schematic block diagram of a MIMO system 400 which includes transmit antenna array(s) 420 at a sender or transmitter which could be the base-station or a user (ULE) and receive antenna array(s) 430 at another UE which communicate over a wireless channel 410. The UE receiver 450 generates soft-outputs in the form of log-likelihood ratios (LLRs) using one of the processes of FIGS. 1-3 for symbols of interest, based on a received observation vector and an estimated channel matrix. The received observation vector is the output of the MIMO channel in response to multiple input symbols. The receiver knows the constellation to which each input symbol belongs but does not have to generate LLRs for some of the input symbols which are not of interest.

The system may be implemented in hardware, firmware or software, or a combination of the three. Preferably the invention is implemented in a computer program executed on a programmable computer having a digital signal processor, a data storage system, volatile and non-volatile memory and/or storage elements, at least one input device and at least one output device.

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for demodulating signals in a multi-input multi-output (MIMO) receiver, comprising:
   a. obtaining a transformed vector by a coordinate transformation of a received observation vector using a unitary matrix determined through QR decomposition of an estimated channel matrix;
   b. maintaining a list containing nodes along with a cost metric for each node;
   c. using the list to generate soft-outputs in the form of log-likelihood ratios (LLRs) for selected symbols of interest, based on the transformed vector and a lower triangular matrix determined through QR decomposition of the estimated channel matrix and the constellations to which the input symbols belong.

2. The method of claim 1, wherein the QR decomposition of the estimated channel matrix comprises H=QL where Q is semi unitary (Q*Q=I); and $$L = \begin{bmatrix} L_{1,1} & 0 & \cdots & 0 \\ L_{2,1} & L_{2,2} & \ddots & 0 \\ \vdots & \vdots & \ddots & 0 \\ L_{K,1} & L_{K,2} & \cdots & L_{K,K} \end{bmatrix}$$

is the lower triangular matrix with positive diagonal elements.

3. The method of claim 1, comprising determining the transformed vector z as: z=Q*y, where y is the vector of received observations.

4. The method of claim 1, comprising selecting a node with a minimum metric among all nodes in the list and removing the selected node from the list.

5. The method of claim 4, comprising determining whether the selected node is a leaf node.

6. The method of claim 4, comprising examining the selected node using an LLR module, if the selected node is a leaf node.

7. The method of claim 4, comprising determining whether the selected node is the first leaf node to be examined by the LLR module and if so, determining the bits corresponding to the selected node and otherwise determining first the bits corresponding to the selected node and then determining an LLR for each index for which the bit of the selected node is different from the bit of the first examined leaf node.

8. The method of claim 1, comprising expanding the descendents of a selected partial or non-leaf node and adding the descendents and their metrics to the list.

9. The method of claim 1, comprising removing all nodes and their metrics from the list which have the same values for symbols of interest as those in a selected leaf node.

10. The method of claim 1, comprising analyzing at-most a predetermined number of leaf nodes using an LLR module.

11. The method of claim 10, comprising removing non-leaf nodes from the list to leave only leaf-nodes and their metrics in a pruned list.

12. The method of claim 10, comprising generating a pruned list if more than a predetermined number of LLRs have been generated or if more than a predetermined number of leaf nodes have been analyzed.

13. The method of claim 1, comprising forcing the list to only contain nodes whose associated metrics are less than a specified input parameter C.

14. The method of claim 13, comprising adding only children to the list whose associated metrics are no greater than C.

15. The method of claim 13, wherein the input parameter C is incremented if the list becomes empty before an LLR analysis of D leaf nodes, where D is also a predetermined selection.

16. The method of claim 1, comprising determining whether all required LLRs have been generated by checking if a set $\Omega$ is empty.

17. The method of claim 12, wherein if the set $\Omega$ is not empty, comprising determining the magnitude of the remaining LLRs as a large positive number.

18. The method of claim 17, wherein the large positive number equals the magnitude of the largest generated LLR.

19. The method of claim 1, comprising generating soft-outputs in the form of LLRs for a specified subset of the input quadrature amplitude modulation (QAM) symbols.

20. The method of claim 19, comprising:
   identifying a root node and the child of the root node having the smallest metric; and
   selecting from the children of all nodes in a list, a best child having the smallest metric.

21. The method of claim 19, comprising determining a best valid node among all nodes in a list and removing the best valid node from the list.

22. The method of claim 21, comprising determining for each selected leaf node a valid sibling with the smallest metric and adding the sibling to a list.

23. The method of claim 22, comprising determining for each selected non-leaf node a valid sibling with the smallest metric and a valid child with the smallest metric and adding them to a list while adding the selected node to another list.

24. A demodulator in a multi-input multi-output (MIMO) receiver, comprising:
   a. means for obtaining a transformed vector by a coordinate transformation of a received observation vector using a unitary matrix determined through QR decomposition of an estimated channel matrix;
   b. means for maintaining a list containing nodes along with a cost metric for each node;
   c. means for using the list to generate soft-outputs in the form of log-likelihood ratios (LLRs) for selected symbols of interest, based on the transformed vector and a lower triangular matrix determined through QR decomposition of the estimated channel matrix and the constellations to which the input symbols belong.

25. A wireless system, comprising:
a multi-input multi-output (MIMO) base station; and
a MIMO receiver adapted to communicate with the MIMO base station, comprising:
  a. means for obtaining a transformed vector by a coordinate transformation of a received observation vector using a unitary matrix determined through QR decomposition of an estimated channel matrix;
  b. means for maintaining a list containing nodes along with a cost metric for each node;
  c. means for using the list to generate soft-outputs in the form of log-likelihood ratios (LLRs) for selected symbols of interest, based on the transformed vector and a lower triangular matrix determined through QR decomposition of the estimated channel matrix and the constellations to which the input symbols belong.

* * * * *